US007079253B2

(12) United States Patent
North-Morris et al.

(10) Patent No.: US 7,079,253 B2
(45) Date of Patent: Jul. 18, 2006

(54) TRACKING OF A TUNABLE LASER OVER OUTPUT DISCONTINUITIES

(75) Inventors: Michael B. North-Morris, Tucson, AZ (US); Anthony S. Lee, Petaluma, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 440 days.

(21) Appl. No.: 10/630,430

(22) Filed: Jul. 29, 2003

(65) Prior Publication Data

US 2005/0025198 A1 Feb. 3, 2005

(51) Int. Cl.
*G01B 9/02* (2006.01)
*G01J 3/45* (2006.01)

(52) U.S. Cl. ...................................................... 356/454

(58) Field of Classification Search ................ 356/451, 356/454, 480, 519

See application file for complete search history.

(56) References Cited

U.S. PATENT DOCUMENTS 4,172,663 A * 10/1979 Byer et al. .................. 356/454
4,272,734 A * 6/1981 Jarrett et al. .................. 372/32
5,568,255 A * 10/1996 Johnson ...................... 356/519
6,870,629 B1 * 3/2005 Vogel et al. ................ 356/519
6,885,462 B1 * 4/2005 Lee et al. .................. 356/519

* cited by examiner

*Primary Examiner*—Gregory J. Toatley, Jr.
*Assistant Examiner*—Michael A. Lyons

(57) ABSTRACT

A tracking stage has an optical filter with a free spectral range greater than the maximum mode hop of a tunable laser. The free spectral range is sufficient to determine the wavelength of the laser output after the mode hop. The output is dithered or a quadrature signal is used to determine whether the mode hop is forwards or backwards. In a further embodiment, a second tracking stage with a shorter free spectral range is coupled to the tunable laser to provide enhanced wavelength resolution. Alternatively, the second tracking stage is omitted and the signal of the tracking stage is amplified to enhance wavelength resolution.

19 Claims, 3 Drawing Sheets

TRACKING OF A TUNABLE LASER OVER OUTPUT DISCONTINUITIES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to tracking the wavelength of a tunable laser, and more specifically to using a tracking stage with a large free spectral range to track the output wavelength of a tunable laser over discontinuities.

BACKGROUND OF THE INVENTION

Tunable lasers are used in a variety of applications, such as optical test sets for measuring wavelength-dependent characteristics of optical devices and in optical test instrumentation. In optical heterodyne systems, swept tunable lasers are typically used as the local oscillator. The optical output of the local oscillator is combined with the optical test signal in an optical mixer, and the resulting intermediate frequency is measured. The wavelength of the optical test signal is calculated from the intermediate frequency and the frequency of the local oscillator. Thus, it is important to track the wavelength of the local oscillator. Unfortunately, swept tunable lasers that sweep continuously over a wide spectral range are expensive. Less expensive swept tunable lasers are available, but sweep over a narrower spectral range before mode hopping. Mode hopping generally occurs when the lasing mode suddenly changes, and results in a discontinuity in the output wavelength from the laser that interferes with wavelength tracking.

BRIEF SUMMARY OF THE INVENTION

An optical system with a tunable laser uses a coarse tracking stage with a free spectral range ("FSR") greater than the largest expected wavelength discontinuity ("mode hop") to track the relative output wavelength of the swept tunable laser over output wavelength discontinuities. In one embodiment, a phase detector tracks the phase change of the analog electrical signal of the coarse tracking stage and the output of the phase detector is multiplied to enhance wavelength resolution from the coarse tracking stage. In another embodiment, an optical system with a tunable laser uses a fine tracking stage and a coarse tracking stage to track the relative output wavelength of the swept tunable laser over output wavelength discontinuities. The fine tracking stage provides accurate tracking of the relative output wavelength during the sweep, and the coarse tracking stage tracks the output wavelength across discontinuities. Combining the information obtained from the coarse tracking stage with the information obtained from the fine tracking stage provides accurate relative wavelength tracking of the swept tunable laser over output wavelength discontinuities. Adding a wavelength reference, such as an optical absorption cell, to the optical system provides absolute wavelength information.

DETAILED DESCRIPTION OF THE EMBODIMENTS

I. Introduction

The present invention provides tracking of a tunable laser over wavelength discontinuities. A coarse tracking stage has a sufficiently large FSR to track the wavelength discontinuity. A phase detector and frequency multiplier between the coarse tracking stage and analog-to-digital converter improves the wavelength resolution of the coarse tracking stage. Alternatively, a fine tracking stage has a sufficiently small FSR to provide the desired relative wavelength resolution. In a further embodiment, a quadrature signal on the coarse tracking stage indicates the direction of movement of the output wavelength, i.e. whether the mode hop results in an increase or decrease in wavelength. In a still further embodiment, a quadrature signal on the fine tracking stage indicates jitter, i.e. whether the output wavelength is locally increasing or decreasing.

A tracking stage generally has a wavelength-dependent optical filter that produces a periodic wave as a function of input wavelength, such as a multiple-pass (multiple-beam) fiber interferometer or a Fabry-Perot filter, between the optical signal from the tunable laser and a detector. The detector provides a periodic electrical signal, such as a sine wave, as the tunable laser is swept and the wavelength of the optical output changes. If the tracking stage includes a quadrature signal, a quadrature detector provides a periodic electrical signal that is 90° out of phase with the signal of the detector, such as a cosine wave. The difference between two points on the periodic electrical signal of the detector represents a difference in wavelength of the optical output of the tunable laser.

A discontinuity in the wavelength of the optical output occurs if the tunable laser mode hops. During a mode hop the wavelength of the optical output of the tunable laser that has been sweeping in a continuous fashion suddenly jumps to a longer or shorter wavelength.

II. Illustration of Mode Hopping

Figure 1A:
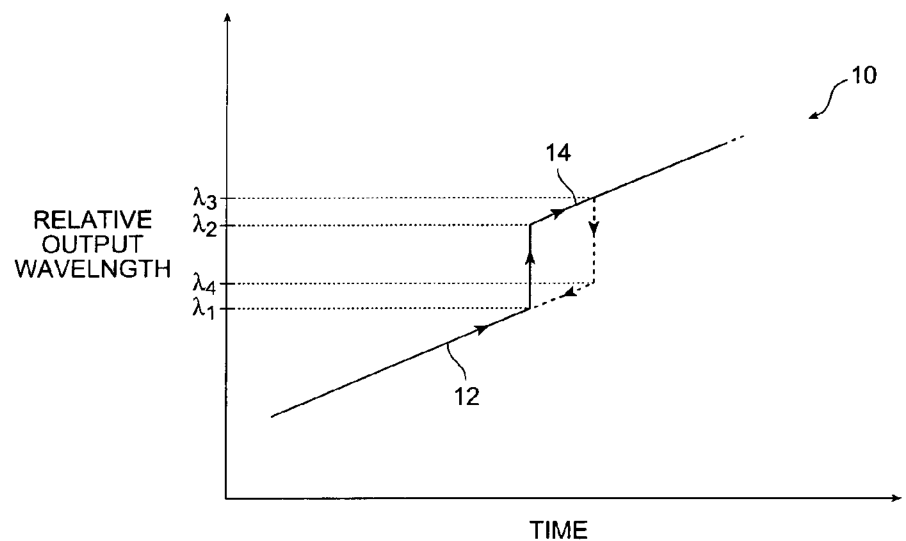
FIG. 1A is a graph of relative wavelength versus time for a swept tunable laser output 10 illustrating mode hopping.

FIG. 1A is a tuning curve 10 for a swept tunable laser illustrating mode hopping. The output wavelength of the swept tunable laser increases with time in response to a tune signal provided to the swept tunable laser from a tune circuit (not shown) over a first continuous tuning range 12. When the output wavelength reaches the end of the first continuous tuning range 12 at wavelength $\lambda_1$, the mode of the swept tunable laser "hops" to the beginning of a second continuous tuning range 14 at $\lambda_2$ and continues tuning over the second continuous tuning range 14. The wavelength hop (i.e. $\lambda_2$-$\lambda_1$) is shown as a positive hop, but the wavelength hop could be negative. The tuning slope before and after the mode hop is shown as being the same, but is not the same in some lasers. The output wavelength and time are relative, and thus shown without units on the axes. The exact wavelength at which the laser mode hops is dependent on several variables, and is not predictable.

Alternatively, a tune signal is provided that decreases the output wavelength of the swept tunable laser over time. The wavelength at which the swept tunable laser mode hops when the output wavelength is decreasing is typically different than the wavelength at which the swept tunable laser mode hops when the output wavelength is increasing. For example, if the output wavelength is decreasing, the swept tunable laser mode hops from wavelength $\lambda_3$ to wavelength $\lambda_4$. This mode hop is shown in dashed lines and the tuning direction is further represented by arrowheads.

Figure 1B:
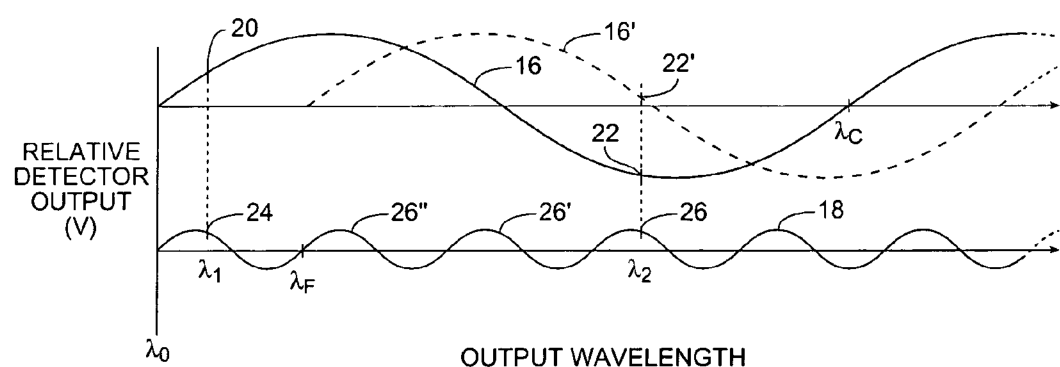
FIG. 1B shows the signal of a coarse tracking stage and the signal of a fine tracking stage according to an embodiment of the present invention.

FIG. 1B shows the detector signal of a coarse tracking stage 16 and the detector signal of a fine tracking stage 18 according to an embodiment of the present invention. Each tracking stage provides a periodic waveform as the swept tunable laser is swept. In one embodiment, a tracking stage includes an optical filter, such as a Fabry-Perot filter or fiber interferometer, in combination with a detector to provide essentially a sine wave voltage signal. The detector signal and output wavelength are relative, and the axes are shown without units.

The FSR of a tracking stage is the difference in tracked wavelength occurring over one period of the periodic waveform of the detector signal. The FSR of the coarse tracking stage is the difference in wavelength between $\lambda_C$ and $\lambda_0$, while the FSR of the fine tracking stage is the difference in wavelength between $\lambda_F$ and $\lambda_0$. When the output wavelength of the swept tunable laser reaches $\lambda_1$ the output wavelength hops to $\lambda_2$ (ref. FIG. 1A). The detector signal of the coarse tracking stage jumps from detector signal 20 to detector signal 22, and the detector signal of the fine tracking stage jumps from detector signal 24 to detector signal 26. The difference in the detector signal of the coarse tracking stage 16 between $\lambda_1$ and $\lambda_2$ lies within one FSR of the coarse tracking stage, but spans more than one FSR of the fine tracking stage 18. The relative frequency difference between $\lambda_1$ and $\lambda_2$ is determined from the signal of the coarse tracking stage 16 in combination with the slope of the detector signal (i.e. whether the detector signal is increasing or decreasing, thus indicating whether the output wavelength is increasing or decreasing). Therefore, having an FSR greater than the maximum mode hop enables tracking the output wavelength over the wavelength discontinuity. One way to determine the maximum mode hop is to characterize a sufficient number of tunable lasers, and then specifying the maximum allowable mode hop over the specified operating range.

An optional quadrature signal 16' of the coarse tracking stage is shown as a dashed line. The quadrature signal 16' is 90° out of phase with the detector signal 16. The designations as to which is the "quadrature signal" is arbitrary, as is whether one signal 16, 16' is advanced or retarded from the other. The condition of quadrature is met if one periodic detector signal is 90° out of phase with the other. Similarly, the amplitudes of the detectors are shown as being similar, but this is not required. The slope and value information from the quadrature signal 22' at $\lambda_2$ combined with the slope and value information from the detector signal 22 at $\lambda_2$ characterizes the magnitude and direction of the mode hop from $\lambda_1$ to $\lambda_2$. For example, if the output wavelength from the tunable laser hopped to a lower wavelength with the same detector signal, the quadrature signal would not be the same, and would indicate that the mode hop was negative. Alternatively, the tunable laser can be tuned to dither the output wavelength. Dithering indicates the slope of the detector signal 16, and when combined with the amplitude of the detector signal is used to determine the relative wavelength after the mode hop.

Referring to the detector signal of the fine tracking stage 18, the mode hop is greater than the FSR of the fine tracking stage and the detector signal 26 at $\lambda_2$ has the same slope and value as detector signals 26' and 26", both of which are between $\lambda_1$ and $\lambda_2$. The detector signal values and slopes obtained from the coarse tracking stage 16 are used to determine the difference between $\lambda_1$ and $\lambda_2$. If a wavelength reference is available, the absolute wavelengths of $\lambda_1$ and $\lambda_2$ are measurable. Alternatively, if the tunable laser is sufficiently stable, a calibration provides absolute wavelength measurements.

An optional quadrature signal on the fine stage (which is omitted from FIG. 1B for simplicity) indicates whether the output wavelength is moving forwards or backwards. In addition to mode hopping, which causes relatively large discontinuities in the output wavelength, mechanical vibration can cause the output wavelength to "jitter". Jitter is a relatively fast-moving, relatively small, back and forth change in the output wavelength. For example, if the laser was tuned to a peak 27 of the detector signal of the fine tracking stage, a small increase in the output wavelength would have the same detector signal as a decrease of the same magnitude. A quadrature signal on the fine tracking stage resolves whether the jitter is an increase or decrease in the output wavelength. In some embodiments, the FSR of the fine tracking stage is chosen to provide sufficient wavelength resolution to account for jitter.

The fine tracking stage enhances resolution of the difference in wavelength between $\lambda_1$ and $\lambda_2$ because the detector signal of the fine tracking stage 18 varies more rapidly with wavelength. Generally, the FSR of the fine tracking stage is chosen according to the desired wavelength resolution after accounting for system error. For example, if a resolution of 0.1 pico-meters ("pm") is desired, and one cycle of the detector signal will be digitized (divided) into 100 parts, an FSR of about 1.5 pm is appropriate. After digitization, the nominal resolution is less than 0.1 pm, but with typical system errors a final resolution of about 0.1 pm is obtained. Alternatively, the detector signal is divided into more or fewer parts, typically between about 10 parts to about 1000 parts.

The FSR of the coarse tracking stage is selected according to the greatest expected mode hop of the tunable laser. For example, a relatively inexpensive laser that is tunable over 30–40 nano-meters ("nm") may have tens of mode hops. The greatest allowable mode hop is specified, and the FSR of the coarse tracking stage is selected to be not less than the greatest expected mode hop. For example, if the maximum specified mode hop is 10 GHz, the FSR of the coarse tracking stage is about 0.1 nm. For swept tunable lasers having mode hops in the tens of GHz, the FSR of the coarse tracking stage is typically about 0.1 nm to about 1.0 nm.

III. Exemplary Optical System

Figure 2:
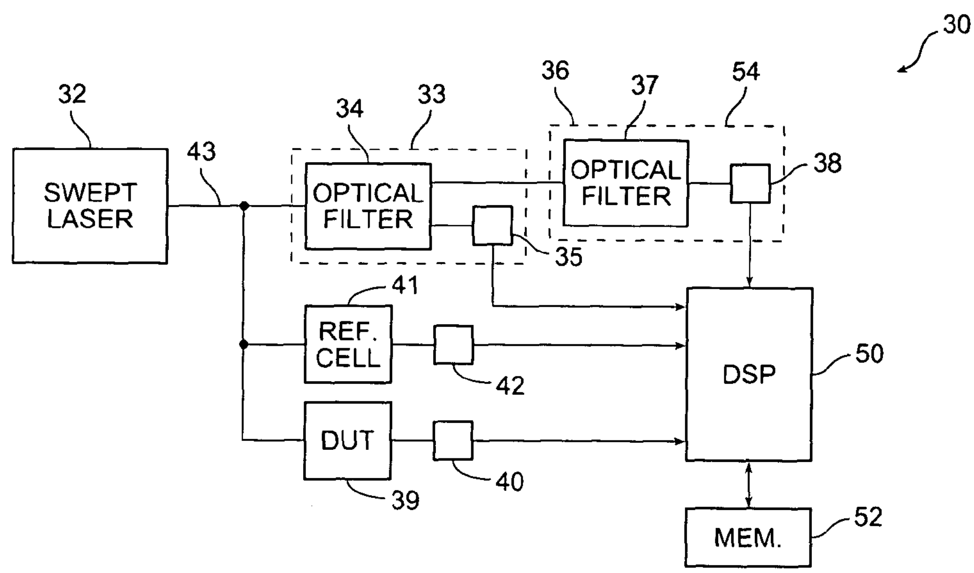
FIG. 2 is a schematic of an optical test system according to an embodiment of the present invention.

FIG. 2 is a schematic of an optical test system 30 according to an embodiment of the present invention. Several common elements typically found in optical test systems, such as user input devices, power supplies, output device (e.g. display or printer), and drive circuitry, are omitted for simplicity of illustration. A swept tunable laser 32 provides a swept optical output to a first tracking stage 33, a second tracking stage 36, a device under test ("DUT") 39 and an optional wavelength reference cell 41, such as a gas absorption cell. A swept optical output 43 from the swept tunable laser 32 is carried on an optical waveguide, such as an optical fiber. The swept optical output is provided to the DUT 39, and the transmission response of the DUT 39 is measured by a DUT detector 40. Alternatively, the reflection response of the DUT is measured with an appropriately configured DUT detector, or a second DUT detector is provided to simultaneously measure the transmission and reflection response of the DUT. The DUT detector 40 converts light from the DUT 39 to an electrical signal (detector signal), which is provided to a digital signal processor ("DSP") 50. The DSP digitizes the signal of the detector(s) and includes digital logic circuitry for signal processing.

The first tracking stage 33 includes a first optical filter 34 and a first detector 35. The first tracking stage 33 is a coarse tracking stage, that is, the first optical filter 34 has an FSR greater than the maximum expected mode hop (measured in wavelength) of the swept laser 32 over the wavelengths of interest, and in one embodiment has an FSR greater than twice the maximum expected mode hop. The second tracking stage 36 is a fine tracking stage and has a second optical filter 37 with an FSR less than the maximum expected mode hop.

Alternatively, the first tracking stage is a fine tracking stage and the second tracking stage is a coarse tracking stage. In a particular embodiment, for a swept laser having a tuning range of 40 nm and a maximum expected (specified) mode hop of 0.05 nm, the FSR is 0.1 nm for a coarse tracking stage without quadrature and 0.05 nm for a coarse tracking stage with quadrature. When using a tracking stage with detector signals in quadrature, the entire cycle of the output of the tracking stage can be used to determine the wavelength of the input signal because the direction of the mode hope (i.e. whether it is an increase or decrease in wavelength) is known. Without quadrature, the direction of the mode hop is uncertain and the minimum FSR of the output stage is doubled to detect increasing or decreasing mode hops. The FSR of the fine tracking stage is 10 pm when a cycle of the signal of the fine tracking stage is divided into one hundred parts, providing a system resolution of about 0.1 pm. In an alternative embodiment, a cycle of the signal of the fine tracking stage is divided into ten parts to obtain a system resolution of about 1 pm.

The first optical filter 34 is a filter that produces a first periodic optical signal as a function of input wavelength. Examples of suitable optical filters include multiple-beam fiber interferometers and Fabry-Perot filters. The response of the optical filter is typically temperature dependent, and Fabry-Perot filters are preferred in some embodiments because they are more easily temperature controlled. The periodic optical signal of the first optical filter is provided to the first detector 35, which converts the first periodic optical signal into a first periodic electrical signal (see FIG. 1B, ref. num. 16). Similarly, the second optical filter produces a second periodic optical signal, which a second detector 38 converts into a second periodic electrical signal (see FIG. 1B, ref. num. 18).

The reference cell 41 typically contains a gas that absorbs a wavelength of light, and a wavelength reference detector 42 produces an electrical signal in the form of a sharp dip when the output wavelength sweeps through the wavelength reference cell 41 and is absorbed by the gas. Other wavelengths pass through the gas in the reference cell. Thus, an absolute wavelength reference (i.e. the wavelength associated with the sharp dip in the wavelength detector signal) is provided to the DSP 50, which can then normalize the relative wavelengths obtained from first and second detectors 35, 38 to obtain the actual (absolute) output wavelength from the swept tunable laser. In other words, when the dip from wavelength reference cell 41 is detected, the output wavelength from the swept laser 32 is known. The wavelength reference cell can be used to calibrate the test system before measuring a DUT, or can be used dynamically as a DUT is measured.

The first and second periodic electrical signals are provided to the DSP 50 and digitized. The difference in wavelength between two points on the first periodic electrical signal is calculated from the digitized data. The resolution of relative wavelength obtained from the coarse tracking stage is often not sufficient to provide the desired measurement accuracy. The difference in wavelength between two points on the second periodic electrical signal is calculated using data obtained from the coarse tracking stage (see FIG. 1B, ref. nums. 22, 26). The fine tracking stage provides greater wavelength resolution. If a wavelength reference cell 41 is provided, the relative wavelengths measured by the coarse and fine tracking stages can be normalized to provide absolute wavelength information.

DUT detector 40 converts the light transmitted through the DUT 39 to an electrical signal and provides the electrical signal to the DSP 50. The DSP 50 uses the wavelength information obtained from the coarse and fine tracking stages 33, 36 and wavelength reference cell 41 and wavelength reference detector 42 to provide a measured wavelength transmission characteristic of the DUT 39. If the swept laser 32 mode hops, the wavelength characteristic of the DUT 39 over the mode hop is not measurable. However, referring to FIG. 1A, reversing the tune direction of the swept laser 32 often causes the mode hop to occur at a different wavelength. Some or all of the information "lost" during the mode hop is recoverable by sweeping the swept laser in one "direction" (e.g. increasing wavelength), and then in the other direction (e.g. decreasing wavelength). The DSP 50 writes the sweep information to memory 52, and then combines information from sweeps in opposite directions to provide a more complete wavelength characteristic of the DUT 39 occurring within a mode hop.

Figure 3:
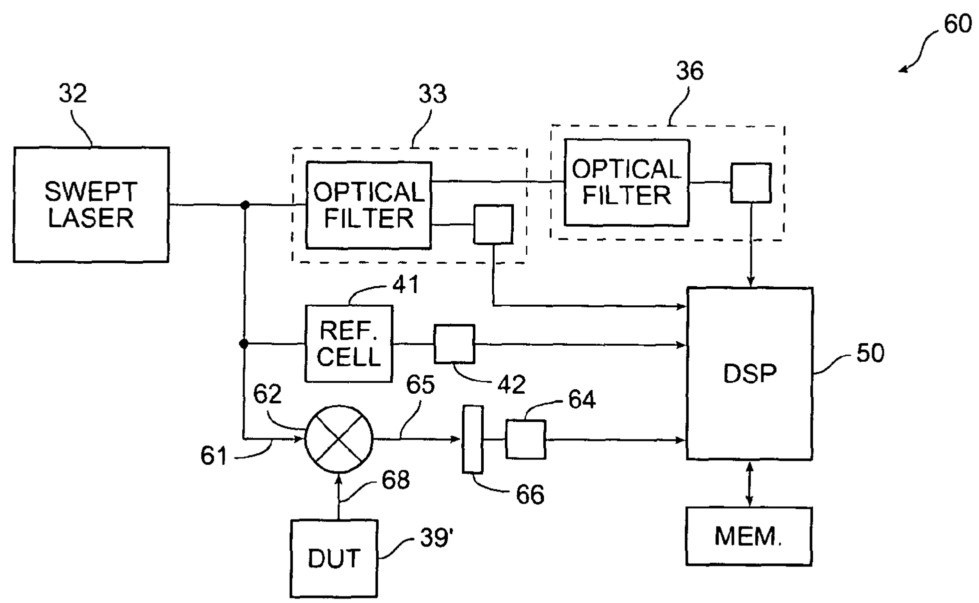
FIG. 3 is a schematic of an optical heterodyne test system according to another embodiment of the present invention.

FIG. 3 is a schematic of a portion of an optical heterodyne test system 60 according to another embodiment of the present invention. The swept laser 32 is used as a local oscillator ("LO") to provide a LO signal 61 to an optical mixer 62. An optical signal from a DUT 39' is also provided to the optical mixer 62. The output from the swept laser is also provided to a first tracking stage 33 and a second tracking stage 36, as discussed above in reference to FIG. 2. An optional wavelength reference cell 41 and wavelength reference detector 42 are provided. The optical mixer 62 provides an intermediate optical signal 65 (commonly referred to as an "IF" signal) to an IF detector 64. An optional optical IF filter 66 is provided between the optical mixer 62 and the IF detector 64.

The optical heterodyne test system 60 is useful for measuring DUTs that are optical sources. The wavelength of the IF signal 65 is the sum or difference of the LO signal 61 and test signal 68 from the DUT 39', as is well known in the art of spectrum analysis. The wavelength of the test signal is calculated from the wavelength of the LO signal 61 (which is swept or tuned) and the wavelength of the IF signal 65 (which is fixed by design), and the wavelength of the LO signal is known from the data provided to the DSP 50 from the first and second tracking stages 33, 36 and wavelength reference cell 41 and wavelength reference detector 42.

Figure 4A:
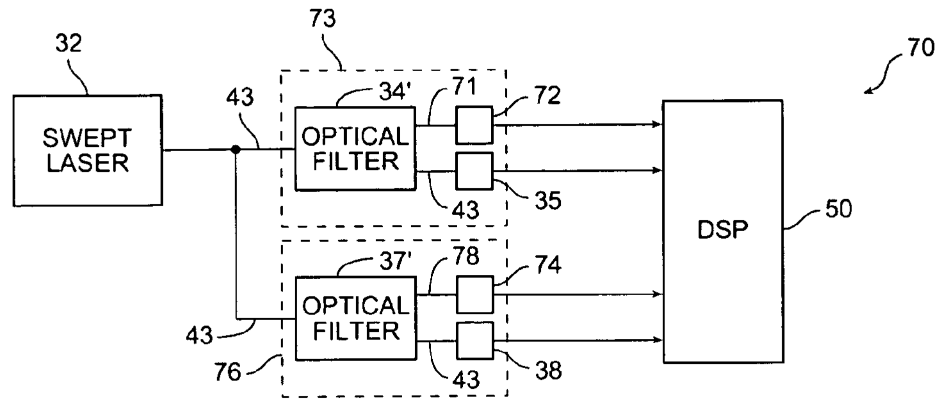
FIG. 4A is a simplified diagram of an optical system with optional quadrature detectors according to an embodiment of the present invention.

FIG. 4A is a simplified diagram of an optical system 70 with optional quadrature detectors 72, 74 from the coarse tracking stage 73 and fine tracking stage 76 according to an embodiment of the present invention. Providing a quadrature detector 72 on the coarse tracking stage 73 enables reducing the FSR of the optical filter 34' to less than twice the maximum expected mode hop (but still equal to or greater than the maximum expected mode hop). The optical filter 34' is a three-port fiber interferometer that provides a quadrature signal 71 to the quadrature detector 72. Alternatively, other optical filters, such as an optical couplet, are used to provide quadrature signals. Although both the coarse 73 and the fine 76 tracking stages are shown with quadrature signals, alternative embodiments provide quadrature signals on only the fine tracking stage 76 or on the coarse tracking stage 73.

The quadrature signal 71 is 90° out of phase with the optical signal 43 from the swept laser 32. A quadrature signal 78 from the second optical filter 37' is provided to a second quadrature detector 74, and the optical signal 43 is provided to the second detector 38. The electrical signals from the detectors 35, 38 and quadrature detectors 72, 74 are provided to the DSP 50. The signal from the quadrature detector 72 is used to determine whether the mode hop was forward (increasing wavelength) or backwards (decreasing wavelength). A swept laser often "backs up" after a mode hop. The signal from quadrature detector 74 provides point-wise determination of whether the signal is increasing or decreasing in wavelength, and resolves wavelength jitter if the FSR of the fine tracking stage is sufficiently short.

Figure 4B:
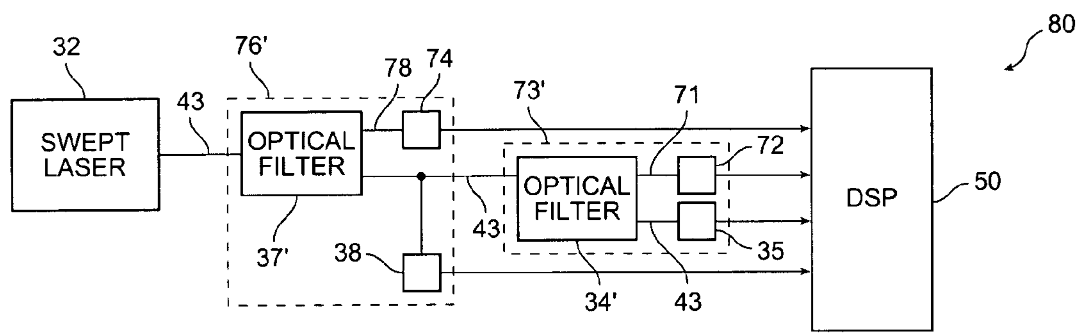
FIG. 4B is a schematic of an optical system according to another embodiment of the present invention.

FIG. 4B is a schematic of an optical system 80 according to another embodiment of the present invention. A fine tracking stage 76' is in series between the swept laser 32 and a coarse tracking stage 73'. The optical filter 37' in the fine tracking stage provides the optical signal 43 from the swept laser 32 to the detector 38 and to the coarse tracking stage 73'. The optical filter 37' also provides an optical quadrature signal 78 to the quadrature detector 74 and in a particular embodiment the optical filter 37' includes a multiple-beam fiber interferometer that provides optical signals in quadrature. Similarly, the optical filter 34' in the coarse tracking stage 73' provides the optical signal 43 to the detector 35 and provides an optical quadrature signal 71 to the quadrature detector 72.

Figure 4C:
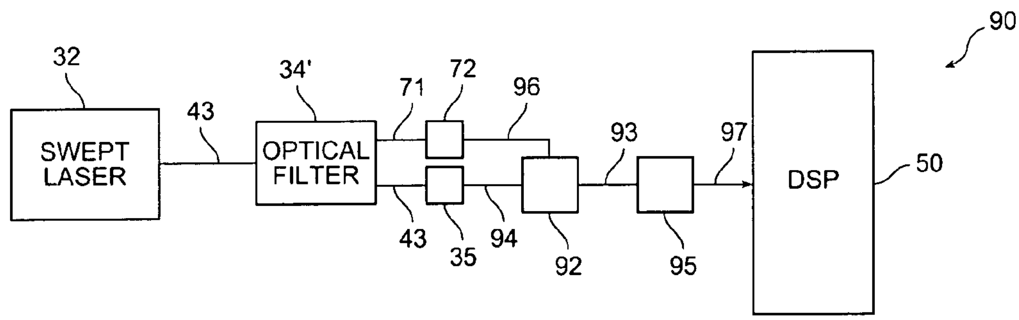
FIG. 4C is a schematic of a portion of an optical system 90 according to an embodiment of the present invention with electronic multiplication of detector signals.

FIG. 4C is a schematic of a portion of an optical system 90 according to another embodiment of the present invention using a phase detector 92 and frequency multiplier 95 to improve relative frequency measurements based on signals 94, 96 of the coarse detectors 35, 72. An optical filter 34' with an FSR not less than the greatest expected mode hop from the swept laser 32 provides an optical signal 43 to a detector 35 and an optical quadrature signal 71 to a quadrature detector 72. The detector electrical signal 94 and quadrature detector electrical signal 96 are provided to the phase detector 92 that provides a phase detector signal 93 to a frequency multiplier 95. The frequency multiplier 95 provides a multiplied phase detector signal 97 to the DSP 50. Fringes (periods) of the optical signal 43 moving through the optical filter 34' are detected by the phase detector 92 and multiplied by the frequency multiplier 95 to increase the apparent speed of movement of the fringes, thus making it easier to resolve the wavelength of the output signal 43.

While the preferred embodiments of the present invention have been illustrated in detail, it should be apparent that modifications and adaptations to these embodiments might occur to one skilled in the art without departing from the scope of the present invention as set forth in the following claims.

What is claimed is:

1. An optical system comprising:

a tunable laser providing a swept optical output;

a tracking stage optically coupled to the tunable laser having an optical filter providing a periodic optical signal in response to the swept optical output to a detector providing a periodic electrical signal, wherein the optical filter has a free spectral range of not less than a greatest expected mode hop of the tunable laser wherein the tracking stage provides a second periodic optical signal in quadrature with the periodic optical signal, a second detector coupled to the second periodic optical signal and providing a second periodic electrical signal;

a phase detector coupled to the detector and to the second detector and providing a phase detector signal;

a frequency multiplier coupled to the phase detector signal providing a multiplied phase detector signal; and a digital signal processor coupled to the multiplied phase detector signal providing enhanced resolution of the swept optical output.

2. The optical system of claim 1 further comprising a digital signal processor coupled to the periodic electric signal to track the swept optical output over mode hops.

3. An optical system comprising:

a tunable laser providing a swept optical output;

a tracking stage optically coupled to the tunable laser having an optical filter providing a periodic optical signal in response to the swept optical output to a detector providing a periodic electrical signal, wherein the optical filter has a free spectral range of not less than a greatest expected mode hop of the tunable laser; and a second tracking stage optically coupled to the tunable laser and having a second optical filter providing a second periodic optical signal in response to the swept optical output to a second detector, wherein the second optical filter has a second free spectral range less than the first free spectral range.

4. The optical system of claim 3 wherein the second free spectral range is selected according to a desired wavelength resolution of the optical system.

5. An optical system comprising:

a tunable laser providing a swept optical output having a discontinuity in output wavelength from a first wavelength at an end of a first continuous tuning range to a second wavelength at a beginning of a second continuous tuning range;

a first tracking stage optically coupled to the tunable laser and having a first optical filter providing a first periodic optical signal in response to the swept optical output to a first detector; and a second tracking stage optically coupled to the tunable laser and having a second optical filter providing a second periodic optical signal in response to the swept optical output to a second detector, wherein the first optical filter has a first free spectral range not less than a difference between the first wavelength and the second wavelength providing tracking of the swept optical output over the discontinuity in output wavelength and the second optical filter has a second free spectral range selected to provide a desired wavelength resolution of the optical system.

6. The optical system of claim 5 wherein the first free spectral range is sufficiently large to track the swept optical output across a maximum expected mode hop of the tunable laser.

7. The optical system of claim 6 wherein the first free spectral range is at least twice the maximum expected mode hop.

8. The optical system of claim 5 wherein the first tracking stage further provides a third periodic optical signal in quadrature with the first periodic optical signal.

9. The optical system of claim 8 wherein the first free spectral range is less than twice the difference between the first wavelength and the second wavelength.

10. The optical system of claim 8 wherein the second tracking stage further provides a fourth periodic optical signal in quadrature with the second periodic optical signal.

11. The optical system of claim 10 wherein the second free spectral range is between 1 pm and 10 pm to achieve a wavelength resolution of the optical system less than 0.1 pm.

12. The optical system of claim 5 wherein at least one of the first optical filter and the second optical filter comprises a Fabry-Perot optical filter.

13. The optical system of claim 5 wherein at least one of the first optical filter and the second optical filter comprises a 3-port fiber interferometer.

14. The optical system of claim 13 wherein the fiber interferometer is a multiple-beam interferometer.

15. The optical system of claim 5 wherein at least one of the first optical filter and the second optical filter comprises an optical couplet.

16. The optical system of claim 5 further comprising:

a digital signal processor coupled to the first detector and to the second detector to determine a direction of a mode hop;

a reference cell optically coupled to the tunable laser; and a reference detector optically coupled to the reference cell providing an electrical reference signal to the digital signal processor to determine an absolute wavelength of the swept optical output tunable laser.

17. The optical system of claim 16 further comprising a third detector wherein the swept optical output is configurable to be coupled to a device under test disposed between the tunable laser and the third detector, the third detector being coupled to the digital signal processor to determine a wavelength response of the device under test.

18. The optical system of claim 16 further comprising:

an optical mixer optically coupled to the tunable laser and to receive an optical signal from a device under test to produce an intermediate optical signal;

an intermediate detector coupled to the intermediate optical signal providing an intermediate electrical signal to the digital signal processor.

19. An optical system comprising:

a tunable laser providing a swept optical output;

a first tracking stage optically coupled to the tunable laser and having a first optical filter with a first free spectral range providing a first periodic optical signal in response to the swept optical output to a first detector and a first quadrature signal to a first quadrature detector; and a second tracking stage optically coupled to the tunable laser and having a second optical filter with a second free spectral range providing a second periodic optical signal in response to the swept optical output to a second detector and a second quadrature signal to a second quadrature detector, wherein the first free spectral range is selected to provide tracking of the swept optical output over a greatest expected mode hop of the tunable laser and the second free spectral range is selected to provide a desired wavelength resolution of the optical system.

* * * * *

UNITED STATES PATENT AND TRADEMARK OFFICE

CERTIFICATE OF CORRECTION

PATENT NO. : 7,079,253 B2
APPLICATION NO. : 10/630430
DATED : July 18, 2006
INVENTOR(S) : North-Morris et al.

It is certified that error appears in the above-identified patent and that said Letters Patent is hereby corrected as shown below:

In column 8, line 24, in Claim 1, after "signal" delete "," and insert --;--, therefor.

Signed and Sealed this

Thirtieth Day of January, 2007

JON W. DUDAS
*Director of the United States Patent and Trademark Office*